united States Patent [19]

Castagnet et al.

[11] Patent Number: 5,162,984
[45] Date of Patent: Nov. 10, 1992

[54] RECTIFIER ABLE TO OPERATE WITH AT LEAST TWO SEPARATE RANGES OF ALTERNATING CURRENT SUPPLY VOLTAGE

[75] Inventors: Thierry Castagnet, Tours; Jean-Claude Bielli, Saint Martin D'Heres, both of France

[73] Assignee: SGS-Thomson Microelectronics S.A., Gentilly, France

[21] Appl. No.: 664,720

[22] Filed: Mar. 5, 1991

[30] Foreign Application Priority Data

Mar. 5, 1990 [FR] France .................. 90 02749

[51] Int. Cl.[5] .................. H02M 1/10; H02M 7/10
[52] U.S. Cl. .................. 363/61; 363/143
[58] Field of Search .................. 363/61, 143; 323/300

[56] References Cited

U.S. PATENT DOCUMENTS

| | | | |
|---|---|---|---|
| 4,268,899 | 5/1981 | Rokas | 363/61 |
| 4,665,323 | 5/1987 | Russell et al. | 307/75 |
| 4,783,729 | 11/1988 | Konopka | 363/143 |

FOREIGN PATENT DOCUMENTS

| | | |
|---|---|---|
| 0129133 | 6/1984 | European Pat. Off. . |
| 0284412 | 9/1988 | European Pat. Off. . |
| 2556522 | 6/1985 | France . |
| 46675 | 3/1982 | Japan .................. 363/143 |
| 60473 | 3/1987 | Japan . |

Primary Examiner—William H. Beha, Jr.
Attorney, Agent, or Firm—Lowe, Price, LeBlanc & Becker

[57] ABSTRACT

A rectifier power supply automatically adjusts to operate over either of two separate ranges of AC line voltages by reconfiguring filter capacitors so as to charge the capacitor serially when operated over the higher range of voltages and to charge the capacitors separately over each half cycle when operated over the lower voltage range. A triac device, used to control charging of the capacitors, is selectively activated only during a small portion of each half cycle to minimize power consumption. The device includes a bridge rectifier circuit receiving an AC line voltage and supplying pulsating DC to the serially connected two filter capacitors. The triac is used as a switch and is connected between one input terminal of the diode bridge and a node point between the two capacitors. An AC line voltage range detector and triac control circuit responsive to the range detector causes the triac to conduct when the AC line voltage is detected within the lower range. In particular, the control circuit causes the triac to conduct after a first time interval after a zero crossing of the AC line voltage and to cease conducting after a second time interval.

12 Claims, 5 Drawing Sheets 5,162,984

RECTIFIER ABLE TO OPERATE WITH AT LEAST TWO SEPARATE RANGES OF ALTERNATING CURRENT SUPPLY VOLTAGE

BACKGROUND OF THE INVENTION

1. Field of the Invention

The present invention concerns a rectifier able to operate with at least two separate ranges of alternating current supply voltage.

2. Description of the Prior Art

To be more precise, the present invention is directed to a rectifier able to adapt automatically to the voltage range including the voltage at which it is supplied with power. This type of rectifier is particularly useful when it is required to power a direct current device from an alternating current supply either to the American standard (110 V, 60 Hz) or to the French standard (220 V, 50 Hz), the voltage being liable to vary significantly about the reference voltage of 110 or 220 V. Other applications are also feasible.

FIGS. 1 and 2 show circuit diagrams of a prior art rectifier of this kind.

The rectifier 10 shown in these figures comprises a diode bridge D1–D4 of which an input (terminals 11 and 12) is connected to an alternating current voltage supply (not shown) and two reservoir capacitors C1 and C2 connected in series with each other and in parallel with an output of the diode bridge (terminals 13 and 14). The capacitors C1 and C2 are usually rated to suit the power output in a ratio of 2 $\mu F/W$. Thus for a rectifier able to deliver a power or 200 W, the value of the capacitors C1 and C2 is 400 $\mu F$. When the rectifier is designed to operate with ranges of supply voltage respectively centered on 110 V and 220 V, at a frequency in the order of 50 to 60 Hz, the ripple voltage across the capacitors C1 and C2 is less than 50 V.

A switch S is connected between an input terminal (terminal 12 here) and a serial connection point 15 between the capacitors C1 and C2. It is associated with a supply voltage range detector 17 and switch control means 16 responsive to the detector 17 and adapted to cause the switch S to be closed when the supply voltage is in a predetermined one of said supply ranges. In practise the switch S is a triac.

The entirely conventional operation of the circuit shown in FIGS. 1 and 2 will now be described.

In the prior art circuit shown in FIGS. 1 and 2, when the detector 17 detects a supply voltage in the second range, for example that centered on 220 V, a signal is sent to the control circuit 16 with the result that the switch is held open; when the detector 17 detects a supply voltage in the first supply range, that centered on 110 V, a signal is sent to the control circuit 16 with the result that the switch S is closed.

In the first case the current paths are as shown in FIG. 1. This figure shows the current $I_+$ which flows during the positive half-cycle in continuous thin line. Note that during this half-cycle the diodes D1 and D2 conduct, the diodes D3 and D4 do not conduct and the current $I_+$ charges the two capacitors C1 and C2. The current $I_-$ flowing during the negative half-cycle is shown in dashed thin line. Note that the diodes D3 and D4 conduct and that the diodes D1 and D2 do not conduct. The current charges the capacitors C1 and C2 equally. The currents $I_+$ and $I_-$ flow in the same direction in the circuit consisting of the capacitors C1 and C2 connected in series.

When the detector 17 detects a voltage in the range centered on 110 V, the switch S is closed (FIG. 2). Note that the current $I_+$ charges only the capacitor C2, the diode D1 being in a non-conducting state because the closing of the switch S has the result of applying to it the voltage across capacitor C1 which reverse biases it. During the negative half-cycle, the current $I_-$ charges only the capacitor C1, the diode D4 being in a non-conducting state because the closing of the switch S has the result of applying to it the voltage across capacitor C2 which reverse biases it.

In the circuit shown in FIG. 2, to close the switch S the control circuit 16 outputs a control current which is in practise applied to the trigger of the triac constituting the switch S. In some applications this control current is in the order of 20 mA, the control circuit typically consuming some 4 W. This is regarded as excessive.

Also, variations in the AC line voltage are sometimes considerable. Considering a rectifier able to operate in 110 V mode and in 220 V mode, this means that in practise, in 110 V mode, the rectifier must be able to operate in a range of voltages from 88 through 132 V, whereas in 220 V mode the rectifier must be able to operate in a range of voltages from 176 through 276 V.

Consequently, the power supply modules of these circuits include high-power resistors (rated at more than 5 W). These components are costly, which can rule out the marketing of rectifiers incorporating them on economic grounds.

It is therefore desirable to be able to reduce the consumption of the switch control circuit so that an inherent saving is achieved and to enable the use in the control circuit power supply circuit of significantly lower rated resistors (rated in the order of 2 W, for example), to achieve a further important saving.

SUMMARY OF THE INVENTION

The present invention consists in a rectifier adapted to operate with at least two separate ranges of AC line voltage comprising a diode bridge having one input adapted to be connected to an AC line voltage, two reservoir capacitors connected in series with each other and shunting an output of said diode bridge, a switch connected between one input terminal of said diode bridge and a series connection point between said two capacitors, an AC line voltage range detector and switch control means responsive to said detector and adapted to cause said switch to be closed when said AC line voltage is in a predetermined one of said AC line voltage ranges, in which rectifier said control means are further adapted to close said switch after a first time interval after a zero crossing of said AC line voltage and to open said switch after a second time interval.

Advantageously, in a preferred embodiment at least part of said switch is a triac and said control means comprise triac control means connected to the trigger of said triac adapted to turn on said triac after said first time interval after each zero crossing of said AC line voltage and to disable control of said triac after said second time interval.

This arrangement achieves the required energy saving. Generally speaking, it is only when the switch is closed that the control circuit outputs a current. Other things being equal, a consumption of 2 W in comparison with the consumption of 5 W in the prior art has been achieved. As a result, it has been possible to use lower power rated (2 W) resistors in the power supply circuit instead of the higher rated resistors used in the prior art.

The characteristics and advantages of the present invention will emerge from the following description given with reference to the appended drawings.

DETAILED DESCRIPTION OF THE INVENTION

Parts and components shown in more than one figure retain the same reference numbers.

Figure 3:
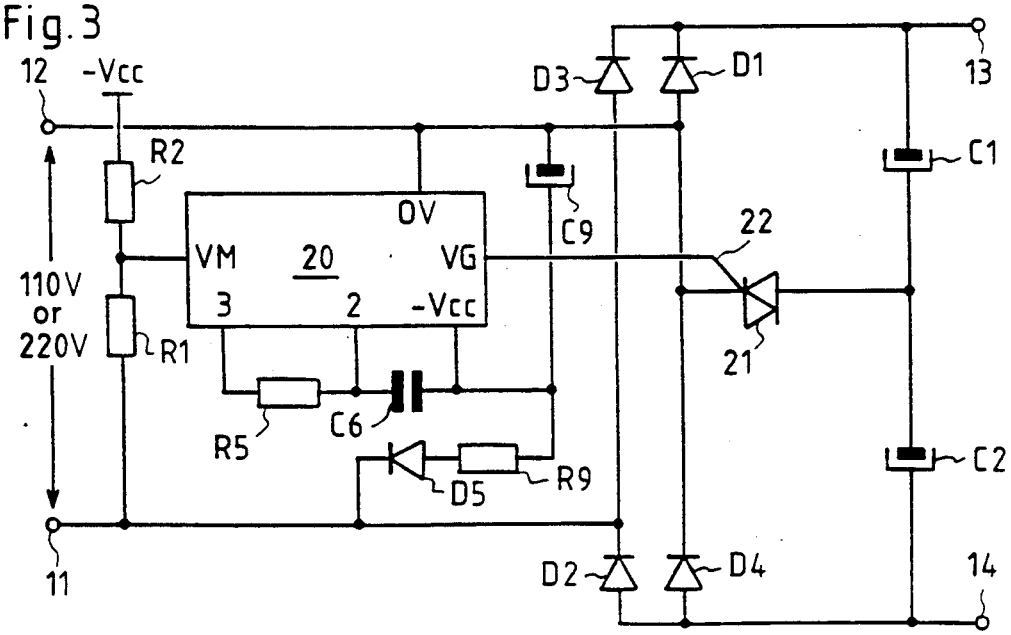
FIG. 3 is a circuit diagram of a rectifier in accordance with the invention.

FIG. 3 shows the input terminals 11, 12 of the diode bridge D1-D4, the two capacitors C1, C2 and the output of the diode bridge 13, 14. The switch S is replaced by a triac 21 whose control electrode or trigger 22 is connected to an output VG of a control circuit 20. The input terminal 11 of the rectifier is also connected to a first resistor R1 (1 MΩ) of a resistor bridge, the common terminal of which is connected to an input VM of the control circuit 20 and the second resistor R2 (18 kΩ) of which is connected to a −Vcc supply terminal of the circuit.

A 0 V terminal of the circuit 20 is also connected to input terminal 12.

The 0 V terminal is also connected to an auxiliary power supply circuit in the form of a reservoir capacitor C9 (100 μF) connected in series with a limiter resistor R9 (18 kΩ) and a rectifier diode D5 connected to the other input terminal 11. The −Vcc terminal of the circuit 20 is connected to the capacitor C9 and the resistor R9.

The circuit 20 is also connected to an RC circuit comprising a resistor R5 (82 kΩ) connected between its terminals 2 and 3 and a capacitor C6 (1 μF) connected between its terminal 2 and its −Vcc terminal.

The control circuit 20 is adapted to close the switch (the triac 21) after a first time interval after each zero crossing of the supply voltage and to open the switch (the triac 21) after a second time interval.

The control circuit 20 is adapted to generate at its output VG control current pulses to turn on the triac, after the first time interval starting from the zero crossing of the supply voltage, and to stop supplying the control current after the second time interval.

The purpose of the control circuit 20 will now be described with reference to FIG. 5.

When the rectifier is supplied at a voltage in a first supply voltage range (in this case that centered on 220 V) the triac does not conduct, in other words the switch is open.

When the supply voltage is in the second range, in this case that centered on 110 V, the triac 21 conducts, in other words the switch is closed, for a predetermined time interval, as will now be explained.

Figure 1:
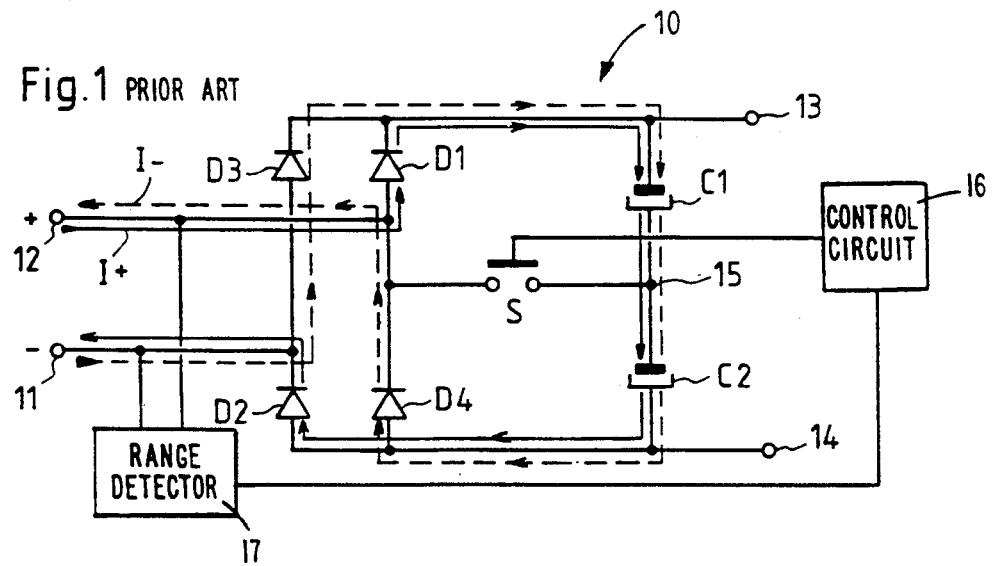
FIGS. 1 and 2 have already been described.
Figure 2:
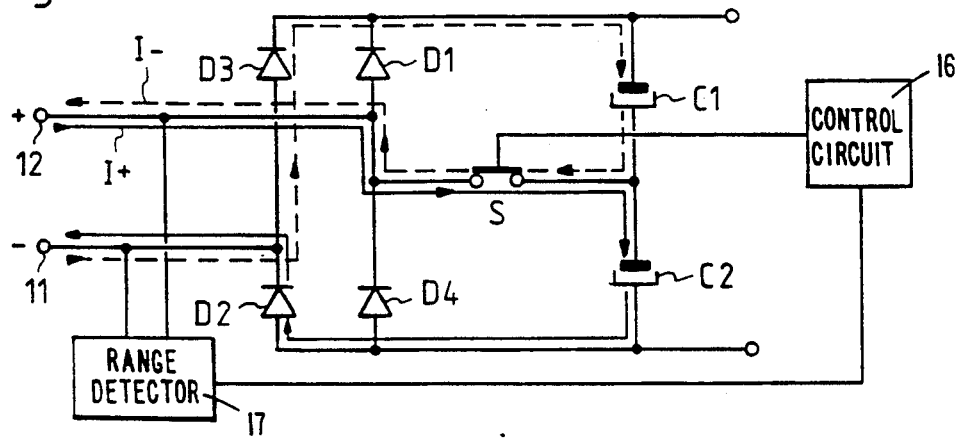

Considering one period of the supply voltage:

during the positive half-cycle (current $I_+$, FIG. 2), the closing of the switch (conduction in the triac) enables charging of the reservoir capacitor C2 which is at this time connected to the negative polarity;

during the negative half-cycle (current $I_-$) the switch is closed to enable charging of the reservoir capacitor C1 which is at this time connected to the positive polarity.

It has been found that the switch need be closed only when the ripple voltage across each capacitor is less than the AC line voltage.

In this embodiment the value of the capacitors C1 and C2 is 400 μF and the ripple voltage across each capacitor is below 50 V.

Figure 5:
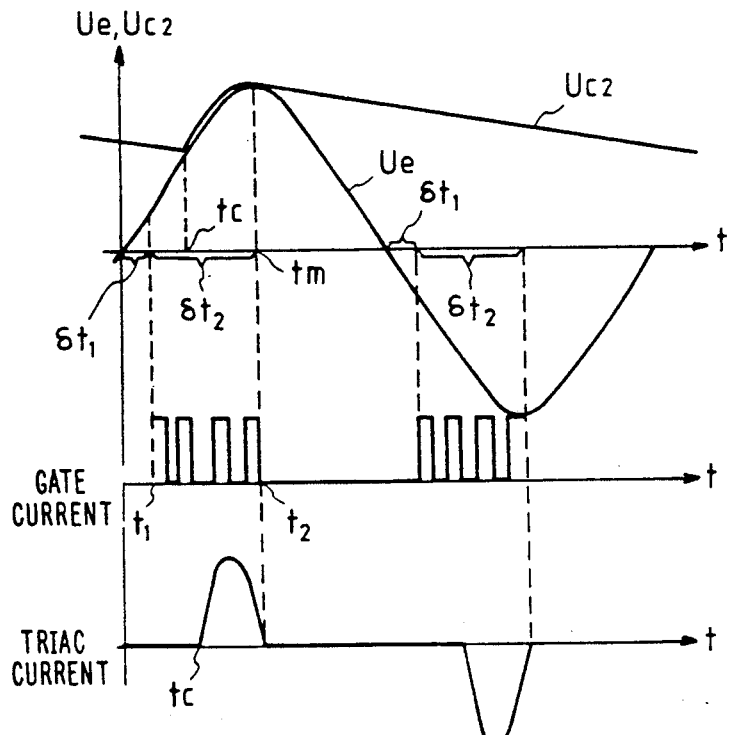
FIG. 5 is a first timing diagram showing various voltages during one period of the AC line voltage supplying the rectifier.

The time at which the voltage across either capacitor falls below the AC line voltage and therefore the time at which the triac 20 must conduct is therefore the time $t_c$ as shown in FIG. 5.

In the upper part of FIG. 5 the curve $U_e$ represents the variation of the nominal supply voltage of 110 V during one period. The curve $U_{C2}$ shows the variation in the voltage across the capacitor C2. The capacitor C2 charges only when the voltage across it is less than the AC line voltage because the voltage across the diode D2 is then positive, which turns it on. The maximum voltage drop across V2 being in the order of 50 V, the capacitor C2 does not begin to charge until the time $t_c$ at which the curve $U_{C2}$ intersects the curve $U_e$.

The capacitor C2 charges only between the time $t_c$ and the time $t_m$ at which the voltage $U_{C2}$ is maximum, in other words, at the end of the first quadrant (90°) because after this the AC line voltage falls (between 90° and 360°) and the capacitor C2 discharges (with a slope such that the voltage across it does not fall by more than 50 V).

So, with regard to the charging of the capacitor C2, it has been found that the triac needs to conduct only between the times $t_c$ and $t_m$, the diode D2 conducting between these times.

The same remarks apply to the charging and the discharging of the capacitor C1 and the turning on of the triac, except that the capacitor C1 charges only during the negative half-cycle.

The curve $U_e$ shown in FIG. 5 is that of the nominal AC line voltage of 110 V. In practise the AC line voltage can fall below the nominal value (in this context to a lower limit value of 88 V) or can increase above the nominal value (in this case to an upper limit value of 132 V). Likewise, the frequency can be 50 Hz or 60 Hz.

The earliest the curve $U_{C2}$ will intersect the curve $U_e$ (which yields the theoretical minimum value of $t_c$) is when the AC line voltage is 88 V at 60 Hz. Allowing for L a maximum ripple of 50 V the minimum value of $t_c$ is 1.7 ms after the zero crossing of the AC line voltage, in the first quadrant (allowing a safety margin and allowing for the components used in this embodiment, there will be assumed here a minimum value of $t_c$ of 1.6 ms—this is the reference time $t_1$ in the various timing diagrams). Other minimum values for $t_c$ are obtained with different AC line voltages and capacitors.

The time $t_m$ is determined essentially by the AC line voltage frequency and, the lower this frequency, the further it is away from $t_c$. For a frequency of 50 Hz, the time $t_2$ representing the maximum value of $t_m$ is 5 ms after the zero crossing of the AC line voltage in the first quadrant (3.4 ms after the first time interval of 1.6 ms).

There is therefore defined in the positive half-cycle a first time interval $\delta t_1$ after the zero crossing of the AC line voltage (1.6 ms in this example) at which the triac must conduct and a second time interval $\delta t_2$ beginning at $t_1$ and at the end of which ($t_2$) the triac must be turned off (in this example $\delta t_2 = 3.4$ ms). As a general rule, the end of the time interval $\delta t_1$ is determined by the minimum theoretical value of $t_c$ allowing for the ripple on the voltage across the capacitor C2, the minimum value of the line voltage and the maximum frequency of the AC line voltage, possibly with a safety margin (in this example 0.1 ms). The end of the second time interval $\delta t_2$ is essentially determined by the minimum value of the line voltage frequency and is fixed at the time when the voltage value is maximum (90° or 270°), with an optional safety margin.

Similar reasoning gives values of the time intervals $\delta t_1$ and $\delta t_2$ for the capacitor C1 identical to in the third quadrant (between 180° and 270°) and calculated on the basis of the zero crossing of the AC line voltage at the end of the second quadrant. Once again, these values depend on the AC line voltage and the capacitors.

FIG. 5 also shows the current in the control electrode 22 of the triac 21 and the current flowing through the triac. Note that the control circuit 20 is adapted to send current pulses during the time interval $\delta t_2$ and the current flows in the triac in one direction and then in the other only during the time interval during which the capacitor C1 or C2 charges.

The control circuit 20 will now be described with reference to FIGS. 4, 6 and 8.

In these figures, the various components have been represented in the conventional way, in particular as used in SGS-THOMSON MICROELECTRONICS catalogue 1988-1989, reference SFST 1188, first edition. The various inputs and outputs of the components have also been shown in the conventional way. The components are from the HCF 4000 CMOS family.

Figure 4:
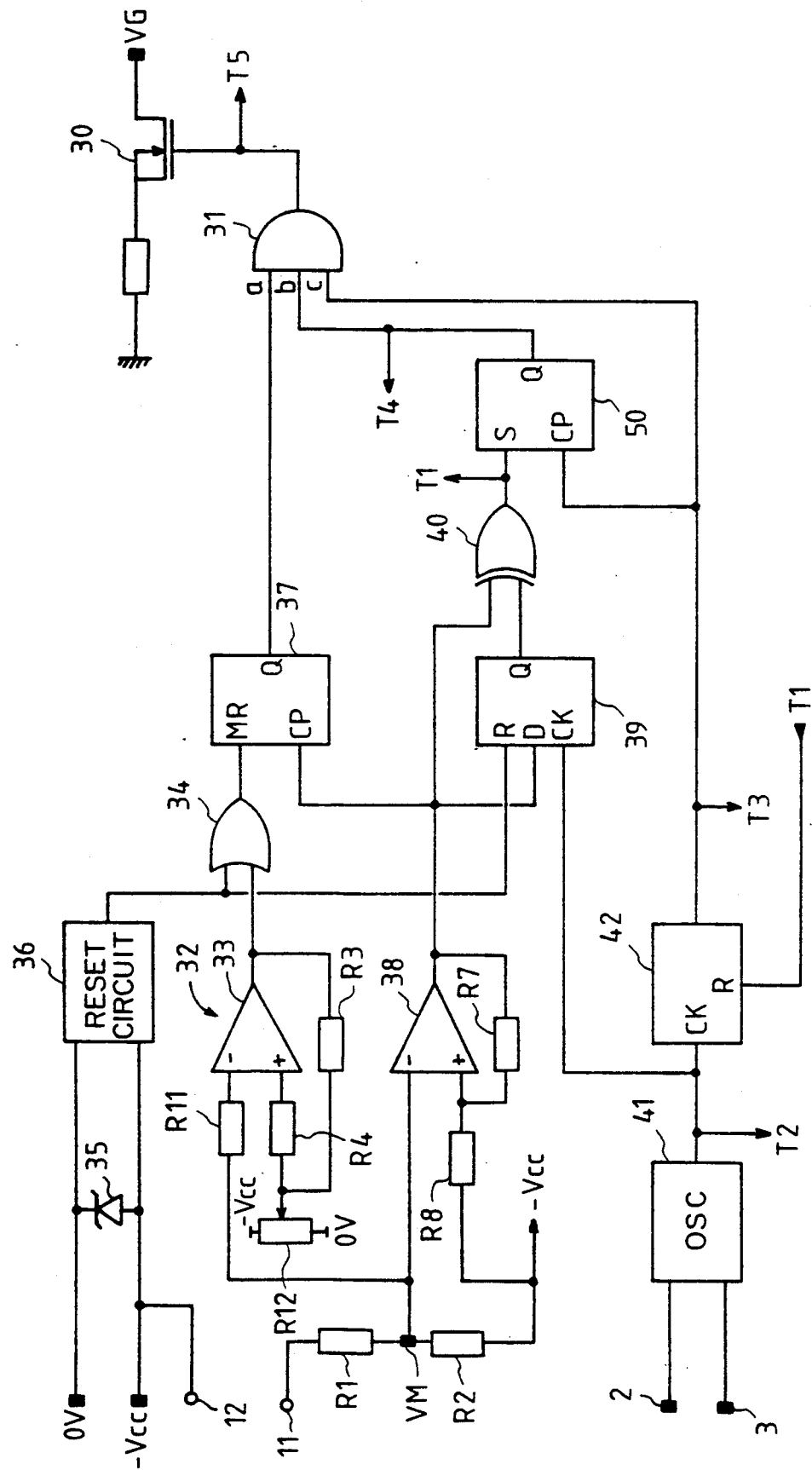
FIG. 4 is a circuit diagram of the control and detector circuit of the rectifier shown in FIG. 3.

FIG. 4 shows the inputs 0 V, −Vcc, VM, 2 and 3 and the output VG of the control circuit 20.

The trigger current of the triac 21 is generated by an NMOS field-effect transistor 30 whose drain is connected to the output VG of the circuit and whose source is connected to a resistor which is grounded. The gate of the transistor 30 is connected to the output of a synthesizer stage comprising an AND gate 31 combining information from various circuits to be described below, the AND gate 31 sending a series of pulses (signal T5) to the gate of the transistor 30 to turn on the triac 21 when a number of conditions are met.

The control circuit 20 includes a voltage level detector stage comprising a detector 32 consisting essentially of a comparator 33 connected to an OR gate 34 whose output is connected to the input MR of a mode controller circuit. The AC line voltage mode controller circuit comprises a flip-flop 37 whose Q output is connected to one input of the AND gate 31.

The control circuit 20 also includes a detector which detects zero crossing of the AC line voltage, in the form of a comparator 38 and a D-type flip-flop 39 (HCF 4013B).

A D-type flip-flop is a logic device having an asynchronous mode (set to zero and reset to zero: inputs S and R) and a synchronous mode in which the state of the input D is copied to the output Q on each rising edge at the clock input CK.

The comparators 33 and 38 are associated with a feedback resistor R3 (220 kΩ) and a negative input resistor R5 (10 kΩ) (respectively R7 (220 kΩ) and R8 (10 kΩ)) which introduces hysteresis into the operation of the comparators. A resistor R11 (10 kΩ) is connected to the negative input of the comparator 33 and to the point VM. The resistors R4 and R11 are used to balance the bias current of the comparator 33. The point VM is connected to the negative input of the comparator 38.

The Q output of the flip-flop 39 is connected to one input of an EXCLUSIVE-OR gate 40 whose output delivers a signal T1 representing zero crossings of the AC line voltage.

The resistors R1 and R2 constitute a voltage divider at the input of the diode bridge providing a reduced scale image (reduction factor 0.018) of the voltage: the signal at VM is applied to the differential input of each comparator 33 and 38.

Each time the voltage changes sign, the output of the comparator 38 changes state:
  logic "1" or 0 V,
  logic "0" or −9 V.

The D-type flip-flop 39 and the EXCLUSIVE-OR gate 40 analyze each change of state of the flip-flop 38. A 25 kHz periodic squarewave signal T2 generated by an oscillator circuit 41 described later is applied to the clock input CK of the D-type flip-flop 39. Each time the output of the comparator 38 changes state the output signal of the gate 40 images the signal T2. A rectangular pulse is therefore generated for each zero crossing of the AC line voltage: this is the signal T1.

Figure 7:
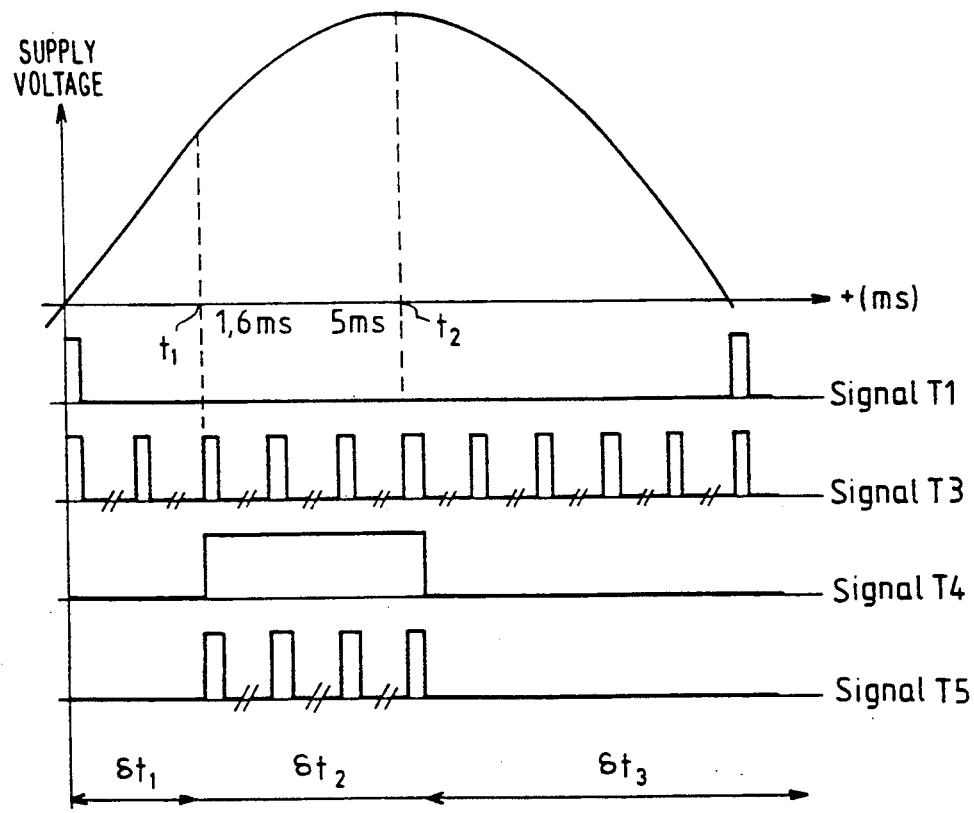
FIG. 7 is a second timing diagram showing some signals.

FIG. 7 is a timing diagram showing some signals and, in its upper part, a positive half-cycle of the AC line voltage. The signal T1 is a rectangular pulse whose rising edge is coincident with the zero crossing of the AC line voltage.

The signal at VM enables a change of AC line voltage range (110 V or 220 V) to be detected by the detector 32. The resistor R4 connected to the positive input of the comparator 33 is connected to the center tap of a potentiometer R12 (3 kΩ) whose ends are connected to the reference voltages 0 V and −Vcc.

Given the values of R1 and R2 (respectively 1 MΩ and 18 kΩ), the voltage at VM is a reduced scale image (reduction factor 0.018) of the voltage on one half-cycle (on the other half-cycle, the diode D5 is short-circuited). This voltage is applied to the negative input of the comparator 33. To the positive input of the comparator is applied a threshold voltage determined by the center tap of the potentiometer R12 and from which the output of the comparator 33 changes sign. Here this threshold is set at 3.75 V (representing an rms voltage of 150 V).

The output of the comparator 33 therefore changes state according to the voltage at the input terminals 11 and 12:
  logic "1" represents the range centered on 220 V,
  logic "0" represents the range centered on 110 V.

The output of the comparator 33 is applied to one input of the OR gate 34 and its output is set to 1.

Figure 11:
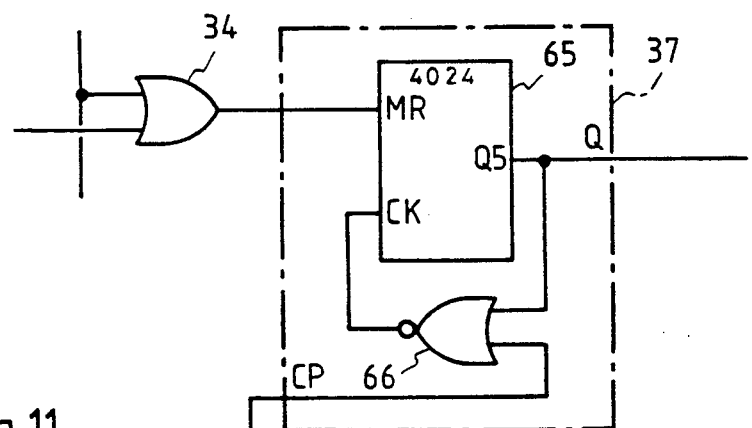

The flip-flop 37 comprises a seven-stage counter 65 (HCF 4024) and an NOR gate 66 (FIG. 11). One input of the NOR gate 66 is connected to the output Q5 of the seven-stage counter 65 and the output of the NOR gate is connected to the clock input CK of the seven-stage counter. The second input of the NOR gate 66 is connected to the input CP of the circuit 37. The input CP is connected to the output of the flip-flop 38.

If the 220 V voltage range is detected, the output of the gate 34 is at logic "1". A logic "1" is therefore applied to the reset to zero input MR of the counter 65 and the output Q5 of the latter is therefore forced to logic "0". Logic "0" is then present at the input a of the AND gate 31 with the result that a logic "0" appears at its output.

When the 110 V voltage range is detected by the comparator 33, the output of the gate 34 is at logic "0" and logic "0" is applied to the input MR of the counter 65. The latter can then count because of the signals applied to its clock input CK. The flip-flop 37 is connected by its input CP to the output of the comparator 38. The output of the comparator 38 changes state each time the voltage applied to the inputs 11, 12 changes sign. The second input of the NOR gate therefore changes state each time the voltage changes sign. This signal is applied to the clock input CK and as the counter 65 is a seven-stage counter, the output Q5 goes to logic "1" after seven rising edges detected by the clock input CK.

The mode controller circuit 37 therefore operates as a delay unit when the 110 V voltage range is detected, the delay being equal to eight AC line voltage periods. At the end of this delay the input of the AND gate 31 goes to logic "1".

The control circuit 20 also includes a circuit for regulating the AC line voltage, in the form of a ZENER diode 35 (BZX 83 C9V1) shunting the 0 V and $-Vcc$ inputs so that the $-Vcc$ terminal is at $-9$ V.

The regulator diode 35 is associated with a reset to zero circuit 36 which generates a pulse when the rectifier is powered up.

Figure 10:
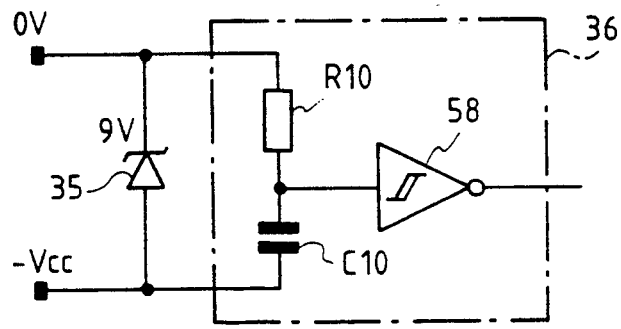
FIGS. 10 and 11 are block diagrams of one embodiment of various circuits shown in FIG. 4.

FIG. 10 is a block diagram of the circuit 36. The circuit 36 includes a resistor R10 (220 kΩ) and a capacitor C10 (33 nF) connected in series with each other and shunting the regulator diode 35. The point common to the resistor R10 and the capacitor C10 is connected to the input of a Schmitt trigger type inverting amplifier 58 whose output is connected to the second input of the OR gate 34. The inverting amplifier 58 is an HCF 40106 B device.

The resistor R10 delays charging of the capacitor C10 on power up. When the rectifier is powered up, the input voltage of the amplifier 58 increases slowly and remains below the threshold of the amplifier 58, which generates at the output a logic "1" which is applied to the input of the OR gate 34 and to the reset to zero input R of the D-type flip-flop 39. When the voltage across the capacitor C10 is equal to the threshold voltage of the amplifier 59, its output switches to logic "0" which is then applied to the OR gate 34 and the R input of the flip-flop 39.

On each power up logic "1" is applied to the reset to zero inputs of the flip-flops 37 and 39 to reset entirely the triac control circuit during a time set by the threshold of the amplifier 59 (5.5 V) and by the time constant of the circuit R10-C10 (7 ms).

The control circuit 20 also includes an oscillator 41 connected to the clock input CK of the flip-flop 39 and to the clock input CK of a frequency divider 42 whose output generates a signal T3.

Figure 6:
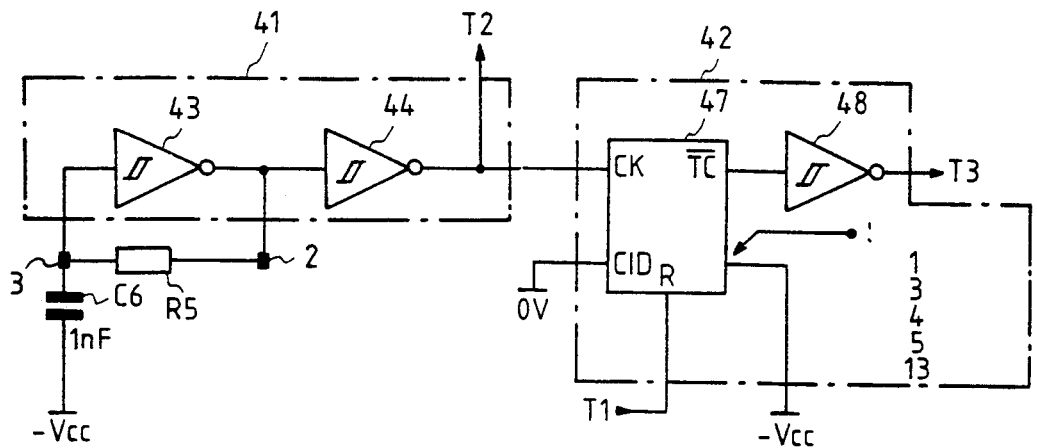
FIG. 6 is a block diagram of one embodiment of the oscillator and the frequency divider shown in FIG. 4.

The circuit 41 which generates a signal T2 comprises two Schmitt trigger type (HCF 40106B) inverting amplifiers 43, 44 (FIG. 6). The feedback resistor R5 (82 kΩ) at the input of the amplifier 43 to which the capacitor C6 (1 nF) is connected is itself connected to the $-Vcc$ input of the circuit.

The oscillator comprising the components R5, C6, 43 and 44 is based on feedback between the input and the output via the resistor which charges the capacitor C6. When the oscillator input connected to the common point of the capacitor C6 and the resistor R5 is at logic "0", the output is at logic "1", which charges said input. The RC circuit R5-R6 introduces a time-delay and by virtue of the hysteresis at the input, the input changes to logic "1" when the common point of the resistor R5 and the capacitor C6 reaches the hysteresis voltage. Oscillation is then produced at the output of the second inverting amplifier 44. This is the 25 kHz signal T2 generating a pulse of 20 µs duration every 40 µs.

The signal T2 is applied to the clock input CK of a frequency divider 47 (HCF 4510). This frequency divider divides by ten. The output TC of the frequency divider connected to the input of a Schmidt trigger type amplifier 48 (HCF 40106B). The components 47 and 48 form the frequency divider 42 shown in FIG. 4.

This frequency divider counts pulses of the signal T2 and generates a pulse T3 for every 10 pulses counted. It is reset by the signal T1 on each zero crossing.

The signal T3 is applied to one input of the AND gate 31 and to an input CP of a circuit enabling and disabling the triac control circuit.

The output of the EXCLUSIVE-OR gate 40 (the signal T1) is connected to an input S of the enable-disable circuit 50.

On the basis of the signals T1 and T3, the enable-disable circuit 50 defines three time intervals for each half-cycle of the AC line voltage (FIG. 7):

on each zero crossing of the AC line voltage the circuit 50 is reset;

it defines the time interval $\delta t_1$ after the zero crossing of the AC line voltage during which triac control is disabled ($\delta t_1 = 1.6$ ms);

it then defines the second time interval $\delta t_2$ during which triac control is enabled ($\delta t_2 = 3.4$ ms);

finally, it disables triac control until the next zero crossing of the AC line voltage ($\delta t_3$). The value of $\delta t_3$ is 3.33 ms for an AC line voltage at 60 Hz or 5 ms for an AC line voltage at 50 Hz.

Figure 8:
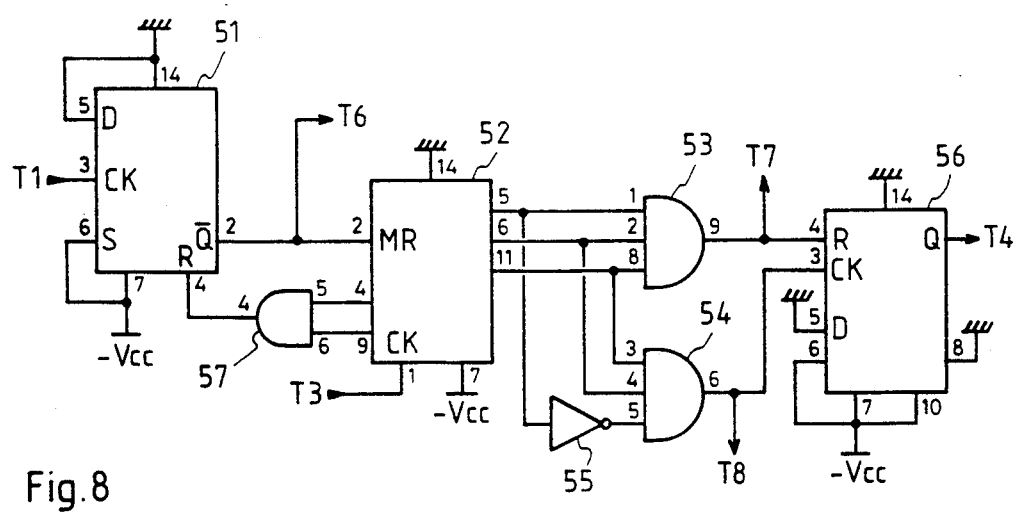
FIG. 8 is a block diagram of one embodiment of the enable-disable controller shown in FIG. 4.

FIG. 8 shows the circuit 50. This circuit essentially comprises an input D-type flip-flop 51 whose Q output is connected to an input MR of a seven-stage counter 52 the outputs 5, 6 and 11 of which are connected to two AND gates 53 and 54, the output 5 of the counter 52 being connected to one input of the AND gate through an inverting amplifier 55. The output of the AND gate 53 is connected to an input R of an output D-type flip-flop 56. The output of the AND gate 54 is connected to the clock input CK of the flip-flop 56. The outputs 4 and 9 of the counter 52 are connected by an AND gate 57 to a reset to zero input R of the input flip-flop 51.

The signal T1 is applied to the clock input CK of the input flip-flop 51 and the signal T3 is applied to the clock input CK of the counter 52. The signal at the Q output of the output flip-flop 56 is a signal T4 applied to the AND gate 31 of the synthesizer stage.

The two D-type flip-flops 51 and 56 are HCF 4013 devices and the seven-stage counter is an HCF 4024 device. The AND gates 53, 54 and 57 are HCF 4073 devices. The inverting amplifier 55 is an HCF 40106B device.

The operation of the circuit 50 will now be described with reference to FIG. 9 which is a timing diagram showing various signals.

The input flip-flop 51 shapes the signal T1 and protects it against any interference affecting the AC line voltage. This flip-flop is set by the rising edge of the pulse T1. The signal T6 at its Q output then goes to logic "0". The input flip-flop 51 is reset after 7 ms by a signal applied to its reset to zero input R.

This latter signal is produced by the counter 52. This counter is adapted to count 35 times the rising edge of the signal pulse T3. Its period is 200 μs. Each time the counter 7 counts 35 times the rising edge of the pulse T3 a signal is therefore generated through the intermediary of the AND gate 57 at the R input of the input flip-flop 51 to reset the latter to zero.

The counter 52 also defines the minimum triac enable time. The time $t_1$ (FIG. 5) is set at 1.6 ms allowing in particular for the 200 μs period of the signal T3 providing the basis for counting. The counter 52 counts eight times the rising edge of the pulse T3 in order to produce at the output of the gate 54 the signal T8 which determines the minimum triac enable time.

Another function of the counter 52 is to determine the maximum triac disable time $t_2$ which is 5 ms after the zero crossing of the AC line voltage. To this end the counter 52 counts 25 times the rising edge of the signal T3 to produce a signal T7 at the output of the gate 53.

The falling edge of the signals T7 and T8 is determined by the rising edge of the signal T6 applied to the input MR of the counter 52 in turn produced on resetting to zero the input flip-flop 51, 7 ms after the zero crossing of the AC line voltage.

The output D-type flip-flop 56 is used to produce the time interval controlling the trigger 22 of the triac 21 from the signals T7 and T8: the rising edge of the signal T7 sets the output flip-flop (to logic "1") and the rising edge of the signal T8 resets it (to logic "0"). This produces a signal T4 which represents this time interval after the zero crossing of the AC line voltage (T4 is at logic "1" during the time interval starting 1.6 ms after the zero crossing of the AC line voltage and ending 5 ms after this zero crossing).

The signal T4 is applied to the synthesizer stage consisting of the AND gate 31. Pulses are sent to the trigger of the triac (signal T5) when the three inputs of the AND gate 31 are at logic "1":

the input a is set to logic "1" with a time-delay of eight periods after the voltage range centered on 110 V has been detected by the comparator 31, as explained above; this input remains at logic "1" for as long as the voltage range centered on 110 V continues to be detected;

a signal at logic "1" is applied to the input b of the AND gate 31 when the signal T4 is at logic "1";

a signal at logic "1" is applied to the input c of the AND gate 31 each time the signal T3 goes to logic "1".

Figure 9:
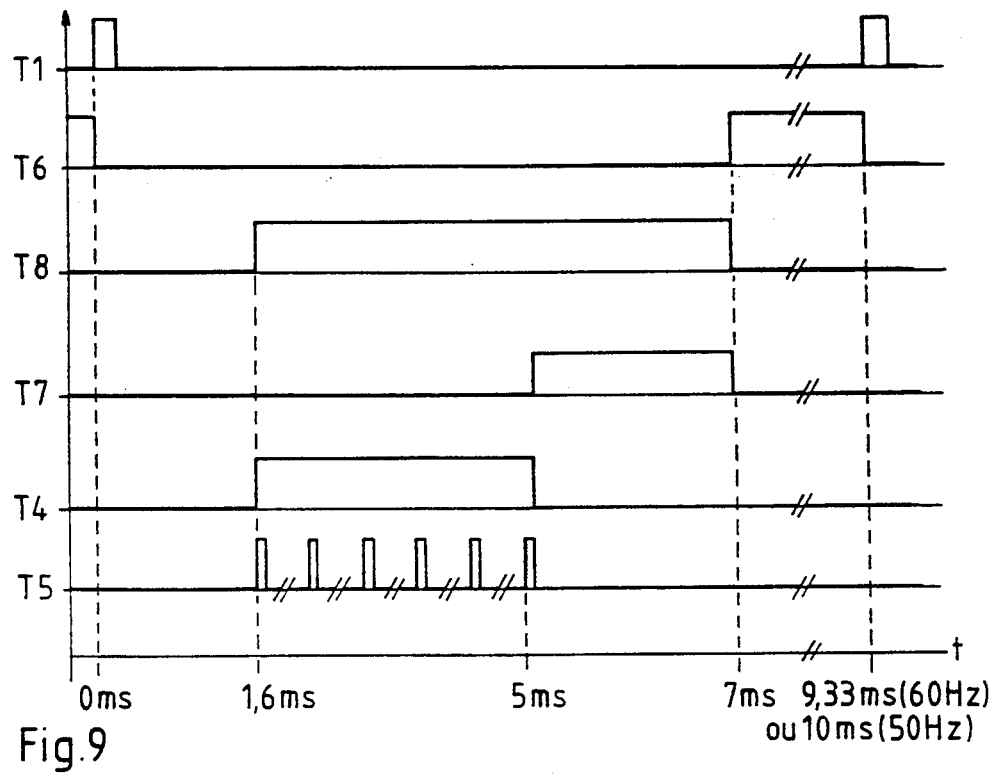
FIG. 9 is a third timing diagram showing some signals.

For as long as the voltage range centered on 110 V is detected, a stream of pulses at 25 kHz is therefore applied to the gate of the transistor 30 during the time interval $\delta t_2$ (FIGS. 7 and 9). A similar stream of pulses is therefore sent to the trigger of the triac 20 connected to the drain of the transistor 30.

In the example that has just been described, a saving in power consumption by the circuit 20 of more than 50% as compared with that achieved in the prior art mentioned above has been achieved.

Of course, the present invention is in no way limited to the embodiment shown but encompasses all variants thereof that will suggest themselves to those skilled in the art. Other components could also be used to turn on the triac only during the time interval $\delta t_2$.

Likewise, this time interval could be chosen to enable the operation of a rectifier in accordance with the invention with ranges of AC line voltage other than those chosen here by way of example.

There is claimed:

1. A rectifier adapted to operate with at least two separate ranges of AC line voltage comprising:
   a diode bridge having one input adapted to be connected to an AC line voltage;
   two reservoir capacitors connected in series with each other and shunting an output of said diode bridge;
   a switch connected between one input terminal of said diode bridge and a series connection point between said two capacitors;
   an AC line voltage range detector; and
   switch control means responsive to said detector and adapted to cause said switch to be closed when said AC line voltage is in a predetermined one of said AC line voltage ranges, in which rectifier said control means are further adapted to close said switch after a first time interval after a zero crossing of said AC line voltage and to open said switch after a second time interval.

2. The rectifier according to claim 1 wherein said switch comprises a triac and said switch control means comprises triac control means connected to trigger said triac to turn on after said first time interval after each zero crossing of said AC line voltage and to disable control of said triac after said second time interval.

3. The rectifier according to claim 1 wherein said switch control means is adapted to close said switch after said first time interval, the end of said first time interval substantially corresponding to a time whereat an instantaneous value of a voltage of said reservoir capacitors is substantially equal to an instantaneous value of said AC line voltage.

4. The rectifier according to claim 1 wherein said first time interval is within a range of 1.6 to 1.7 milliseconds and said second time interval has a duration of approximately 3.4 milliseconds and immediately follow said first time interval.

5. The rectifier according to claim 1 wherein said switch control means comprises:
   a clock for supplying a periodic clock signal;
   a zero crossing detector for detecting a zero crossing of said AC line voltage and, in response, providing a control signal;
   counter means responsive to said periodic clock signal and said control signal for supplying a switch enable signal between said first and second time intervals; and
   trigger means responsive to said switch enable signal for closing said switch after said first time interval and opening said switch after said second time interval.

6. A rectifier adapted to operate with at least two separate ranges of AC line voltage comprising:
   a diode bridge having one input adapted to be connected to an AC line voltage;

two reservoir capacitors connected in series with each other and shunting an output of said diode bridge;

a switch comprising a triac connected between one input terminal of said diode bridge and a series connection point between said two capacitors;

an AC line voltage range detector; and switch control means responsive to said detector and adapted to cause said switch to be closed when said AC line voltage is in a predetermined one of said AC line voltage ranges, said control means adapted to close said switch by turning on said triac after a first time interval after a zero crossing of said AC line voltage and to open said switch by disabling control of said triac after a second time interval, said triac control means are adapted to apply to said trigger of said triac a stream of control pulses during said second time interval.

7. A rectifier adapted to operate with at least two separate ranges of AC line voltage comprising:

a diode bridge having one input adapted to be connected to an AC line voltage;

two reservoir capacitors connected in series with each other and shunting an output of said diode bride;

a switch connected between one input terminal of said diode bridge and a series connection point between said two capacitors;

an AC line voltage range detector; and switch control means responsive to said AC line voltage range for closing said switch when said AC line voltage is in a predetermined one of said AC line voltage ranges, said control means closing said switch after a first time interval after a zero crossing of said AC line voltage and opening said switch after a second time interval, the end of said second time interval corresponding to a maximum absolute value of the AC voltage.

8. The rectifier according to claim 7 wherein said switch comprises a triac and said switch control means comprise triac control means connected to trigger said triac to turn said triac on after said first time interval after each zero crossing of said AC line voltage and to disable control of said triac after said second time interval.

9. The rectifier according to claim 8 wherein said triac control means is adapted to supply to a trigger of said triac a stream of control pulses during said second time interval.

10. The rectifier according to claim 7 wherein said switch control means is adapted to close said switch after said first time interval, the end of said first time interval substantially corresponding to a time whereat an instantaneous voltage of said reservoir capacitors is substantially equal to an instantaneous voltage of said AC line.

11. The rectifier according to claim 7 wherein said first time interval is within a range of 1.6 to 1.7 milliseconds and said second time interval has a duration of approximately 3.4 milliseconds and immediately follows said first time interval.

12. The rectifier according to claim 7 wherein said switch control means comprises:

a clock for supplying a periodic clock signal;

a zero crossing detector for detecting a zero crossing of said AC line voltage and, in response, providing a control signal;

counter means responsive to said periodic clock signal and said control signal for supplying a switch enable signal between said first and second time intervals; and trigger means responsive to said switch enable signal for closing said switch after said first time interval and opening said switch after said second time interval.

* * * * *